United States Patent
Yue et al.

(10) Patent No.: US 12,231,265 B2
(45) Date of Patent: Feb. 18, 2025

(54) METHODS AND APPARATUS FOR CHANNEL ESTIMATION AND PRECODING WITH INCOMPLETE CHANNEL OBSERVATION AND CHANNEL STATE INFORMATION FEEDBACK

(71) Applicant: Huawei Technologies Co., Ltd., Shenzhen (CN)

(72) Inventors: Guosen Yue, Edison, NJ (US); Xiao-Feng Qi, Westfield, NJ (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 17/967,143

(22) Filed: Oct. 17, 2022

(65) Prior Publication Data

US 2023/0051245 A1 Feb. 16, 2023

Related U.S. Application Data

(63) Continuation of application No. PCT/US2020/032373, filed on May 11, 2020.

(51) Int. Cl.
*H04L 25/02* (2006.01)
*H04B 7/06* (2006.01)

(52) U.S. Cl.
CPC ....... *H04L 25/0204* (2013.01); *H04B 7/0626* (2013.01); *H04L 25/021* (2013.01); *H04L 25/0248* (2013.01)

(58) Field of Classification Search
CPC .. H04B 7/0626; H04B 7/0632; H04B 7/0456; H04B 7/0417; H04B 7/0639; H04L 25/0228; H04L 25/0224; H04L 25/0204; H04L 25/021; H04L 25/0248; H04L 25/0256; H04L 25/0258
See application file for complete search history.

(56) References Cited

U.S. PATENT DOCUMENTS

| | | | |
|---|---|---|---|
| 2010/0202548 A1 | 8/2010 | Sanayei | |
| 2015/0030006 A1* | 1/2015 | Fujio | H04B 7/0456 370/336 |
| 2017/0048039 A1* | 2/2017 | Zhao | H04L 5/14 |
| 2018/0041258 A1* | 2/2018 | Tong | H04B 7/0632 |
| 2018/0091207 A1* | 3/2018 | Kakishima | H04L 25/03343 |
| 2019/0052322 A1* | 2/2019 | Akkarakaran | H04B 17/345 |

OTHER PUBLICATIONS

Huawei, et al., "Partial Reciprocity Based CSI Acquisition Mechanism," 3GPP TSG RAN WG1 NR Ad-Hoc#3, R1-1715722, Agenda Item 6.2.2.6, Nagoya, Japan, Sep. 18-21, 2017, 6 pages.
Zhao, et al., "Enhanced CSI Acquisition Scheme for NR TDD Systems with Partial Channel Reciprocity," 2019 IEEE 89th Vehicular Technology Conference, Apr. 28, 2019, pp. 1-5.

* cited by examiner

*Primary Examiner* — Khanh C Tran
(74) *Attorney, Agent, or Firm* — Slater Matsil, LLP

(57) ABSTRACT

Method and apparatus are provided for estimating first downlink (DL) channel information of first DL channels in accordance with reference signals received on first uplink (UL) channels, the first UL channels being a subset of available UL channels, and the first DL channels corresponding to the first UL channels. Channel feedback is received for a set of DL channels, and second DL channel information is estimated in accordance with the estimated first DL channel information and the received channel feedback.

22 Claims, 7 Drawing Sheets

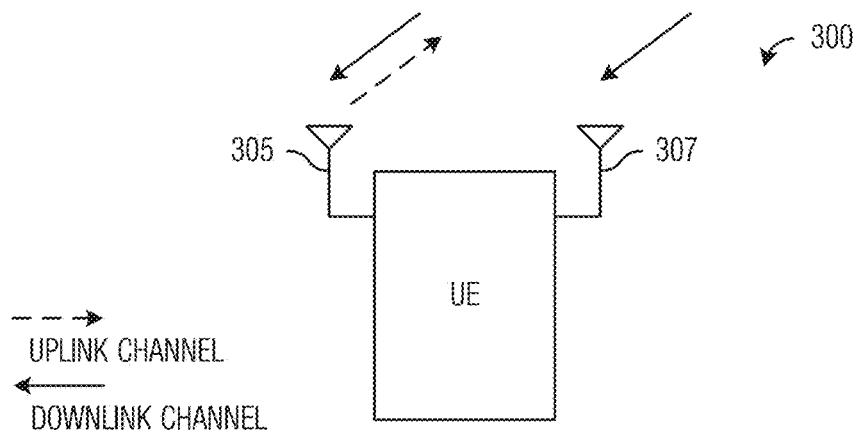
*Fig. 3*
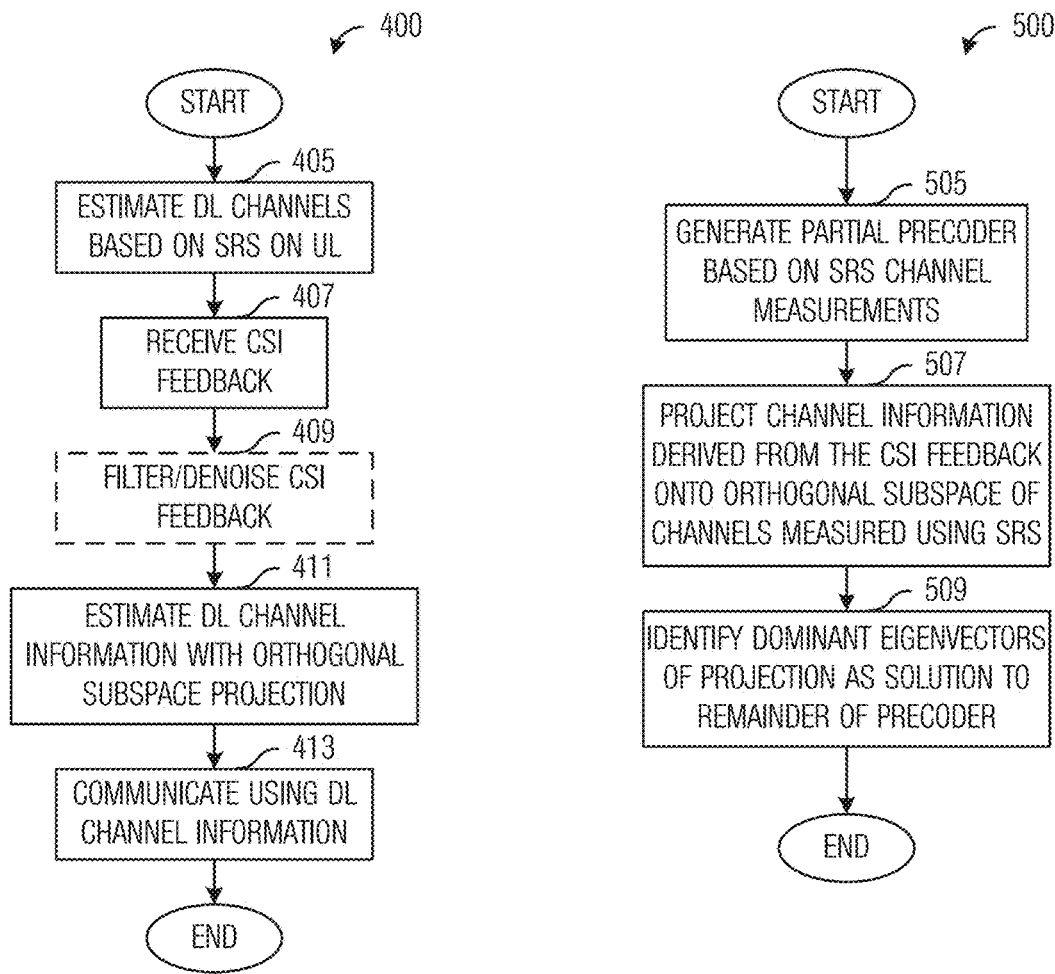
*Fig. 4*
*Fig. 5*

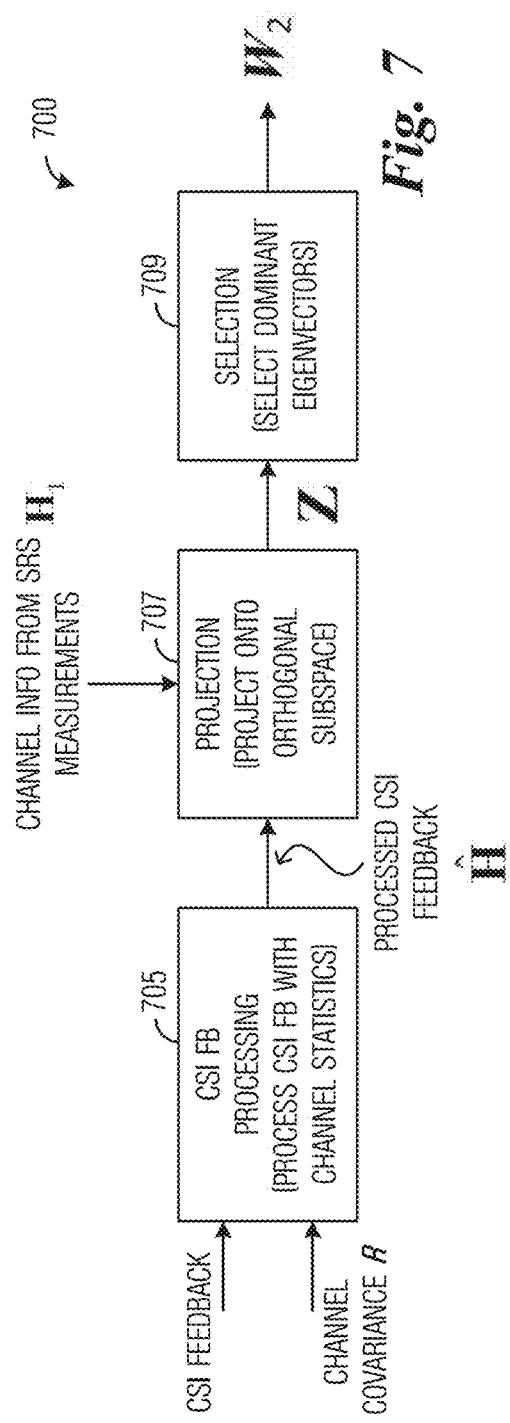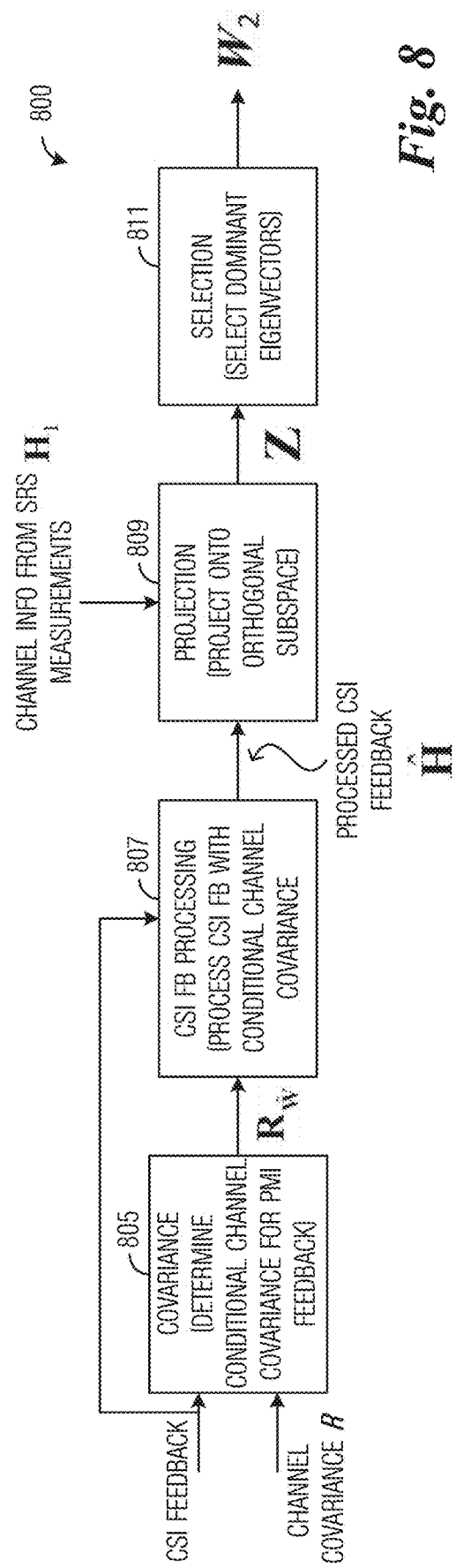
Fig. 7
Fig. 8

METHODS AND APPARATUS FOR CHANNEL ESTIMATION AND PRECODING WITH INCOMPLETE CHANNEL OBSERVATION AND CHANNEL STATE INFORMATION FEEDBACK

CROSS-REFERENCE TO RELATED APPLICATIONS

This application is a continuation of International Application No. PCT/US2020/032373, filed on May 11, 2020, and entitled "Methods and Apparatus for Channel Estimation and Precoding with Incomplete Channel Observation and Channel State Information Feedback," which application is incorporated by reference herein in its entirety.

TECHNICAL FIELD

The present disclosure relates generally to methods and apparatus for digital communications, and, in particular embodiments, to methods and apparatus for channel estimation and precoding with incomplete channel observations and channel state information (CSI) feedback.

BACKGROUND

In modern communication systems, such as The Third Generation Partnership Project (3GPP) Fifth Generation (5G) and 3GPP Long Term Evolution (LTE) compliant communication systems, massive multiple input multiple output (MIMO) communication with many transmitter antennas significantly increases the overall system capacity. The performance of MIMO transmissions relies on the knowledge and accuracy of the downlink (DL) channel state information (CSI), which is used to estimate the channels and to determine the channel matrix.

In time division duplexed (TDD) communication systems, information regarding the DL channel may be obtained via measurements of the uplink (UL) channel utilizing channel reciprocity. In frequency division duplexed (FDD) communication systems, information regarding the DL channel may be obtained from quantized CSI feedback measured and reported by user equipment (UE).

In TDD communication systems, in order to obtain full DL channel information using UL measurements, a UE has to transmit reference signals, such as sounding reference signals (SRSs) on every transmit antenna. This process is referred to as UL channel sounding. However, although a UE typically uses all of its antennas for DL reception, the UE usually does not use all of its antennas for UL transmission. This limitation may be due to a cost reduction measure where the UE does not have a transmit radio frequency (RF) chain for every antenna. Hence, in such a UE, the UE can transmit the reference signals only on antennas with transmit RF chains at any given time.

In some UE implementations, a switch is used to enable a switching of the transmit RF chains so that all of the antennas of the UE can be used to transmit the reference signals. However, the transmission of the reference signals using all antennas requires multiple transmission opportunities. Furthermore, the complexity and cost of the switch are high. Additionally, the delay associated with switching and transmitting the reference signal in different transmission opportunities increases the overhead associated with making UL measurements based on the reference signal transmissions.

Therefore, there is a need for methods and apparatus for channel estimation and precoding with incomplete channel observation and CSI feedback.

SUMMARY

According to a first aspect, a method is provided that is implemented by a node. The method comprising: estimating, by the node, first downlink (DL) channel information of first DL channels in accordance with reference signals received on first uplink (UL) channels, the first UL channels being a subset of UL channels, and the first DL channels corresponding to the first UL channels; receiving, by the node, channel feedback for a set of DL channels; estimating, by the node, second DL channel information in accordance with the estimated first DL channel information and the received channel feedback; and communicating, by the node, in accordance with the second DL channel information.

In a first implementation form of the method according to the first aspect, the second DL channel information comprising information derived from the estimated first DL channel information and an orthogonal projection of the received channel feedback In a second implementation form of the method according to the first aspect or any preceding implementation form of the first aspect, estimating the second DL channel information comprising: projecting, by the node, channel information derived from the received channel feedback onto an orthogonal subspace of the first DL channels, thereby producing a projection; selecting, by the node, one or more dominant eigenvectors of the projection; and combining, by the node, the estimated first DL channel information and the one or more dominant eigenvectors to form the second DL channel information.

In a third implementation form of the method according to the first aspect or any preceding implementation form of the first aspect, communicating in accordance with the second DL channel information comprising precoding, by the node, data in accordance with the second DL channel information.

In a fourth implementation form of the method according to the first aspect or any preceding implementation form of the first aspect, further comprising processing, by the node, the received channel feedback after receiving the channel feedback, thereby producing processed channel feedback.

In a fifth implementation form of the method according to the first aspect or any preceding implementation form of the first aspect, estimating the second DL channel information comprising: projecting, by the node, channel information derived from the processed channel feedback onto an orthogonal subspace of the first DL channels, thereby producing a projection; selecting, by the node, one or more dominant eigenvectors of the projection; and combining, by the node, the estimated first DL channel information and the one or more dominant eigenvectors to form the second DL channel information.

In a sixth implementation form of the method according to the first aspect or any preceding implementation form of the first aspect, processing the received channel feedback comprising filtering or denoising the received channel feedback with channel statistics.

In a seventh implementation form of the method according to the first aspect or any preceding implementation form of the first aspect, filtering or denoising the received channel feedback comprising at least one of MMSE filtering the received channel feedback, a projecting of dominant subspaces of the received channel feedback, MF or MRC based filtering of the received channel feedback, or quadratic programming of the received channel feedback.

In an eighth implementation form of the method according to the first aspect or any preceding implementation form of the first aspect, processing the received channel feedback comprising: determining, by the node, a conditional covariance for the received channel feedback; and filtering or denoising, by the node, the received channel feedback in accordance with the conditional covariance.

In a ninth implementation form of the method according to the first aspect or any preceding implementation form of the first aspect, filtering or denoising the received channel feedback comprising at least one of MMSE filtering the received channel feedback, a projecting of dominant subspaces of the received channel feedback, MF or MRC based filtering of the received channel feedback, or quadratic programming of the received channel feedback.

In a tenth implementation form of the method according to the first aspect or any preceding implementation form of the first aspect, the second DL channel information comprising a DL precoder.

According to a second aspect, a method is provided that is implemented by a node. The method comprising: estimating, by the node, first DL channel information of first DL channels in accordance with reference signals received on first UL channels, the first UL channels being a subset of UL channels, and the first DL channels being associated with the first UL channels; receiving, by the node, channel feedback for a set of DL channels; eigen decomposing, by the node, the first DL channel information; selecting, by the node, one or more dominant first eigenvectors of the eigen decomposition of the first DL channel information as a partial precoder; projectin, by the node, channel information derived from the channel feedback onto an orthogonal subspace of the first DL channels; selecting, by the node, one or more dominant second eigenvectors of the channel information after the projection of the received feedback channel information as second DL channel information of second DL channels, the second DL channels being unassociated with the first UL channels; and combining, by the node, the partial precoder and the one or more dominant second eigenvectors to form a precoder.

In a first implementation form of the method according to the second aspect, the set of DL channels comprising the first DL channels and the second DL channels.

In a second implementation form of the method according to the second aspect or any preceding implementation form of the second aspect, the reference signals comprising sounding reference signals (SRS).

In a third implementation form of the method according to the second aspect or any preceding implementation form of the second aspect, further comprising processing, by the node, the channel feedback after receiving the channel feedback.

In a fourth implementation form of the method according to the second aspect or any preceding implementation form of the second aspect, processing the received channel feedback comprising filtering or denoising the channel feedback with channel statistics.

In a fifth implementation form of the method according to the second aspect or any preceding implementation form of the second aspect, further comprising determining, by the node, a conditional covariance for the channel feedback, the filtering or denoising the channel feedback being in accordance with the conditional covariance.

In a sixth implementation form of the method according to the second aspect or any preceding implementation form of the second aspect, filtering or denoising the received channel feedback comprising at least one of MMSE filtering the received channel feedback, a projecting of dominant subspaces of the received channel feedback, MF or MRC based filtering of the received channel feedback, or quadratic programming of the received channel feedback.

According to a third aspect, a node is provided. The node comprising: a non-transitory memory storage comprising instructions; and one or more processors in communication with the memory storage, wherein the one or more processors execute the instructions to cause the node to: estimate first DL channel information of first DL channels in accordance with reference signals received on first UL channels, the first UL channels being a subset of UL channels, and the first DL channels corresponding to the first UL channels; receive channel feedback for a set of DL channels; estimate second DL channel information in accordance with the estimated first DL channel information and the received channel feedback; and communicate in accordance with the second DL channel information.

In a first implementation form of the node according to the third aspect, the one or more processors further executing the instructions to cause the node to project channel information derived from the received channel feedback onto an orthogonal subspace of the first DL channels, thereby producing a projection; select one or more dominant eigenvectors of the projection; and combine the estimated first DL channel information and the one or more dominant eigenvectors to form the second DL channel information.

In a second implementation form of the node according to the third aspect or any preceding implementation form of the third aspect, the one or more processors further executing the instructions to cause the node to precode data in accordance with the second DL channel information.

In a fourth implementation form of the node according to the third aspect or any preceding implementation form of the third aspect, the one or more processors further executing the instructions to cause the node to process the received channel feedback after receiving the channel feedback.

In a fifth implementation form of the node according to the third aspect or any preceding implementation form of the third aspect, the one or more processors further executing the instructions to cause the node to project channel information derived from the processed channel feedback onto an orthogonal subspace of the first DL channels, thereby producing a projection; select one or more dominant eigenvectors of the projection; and combine the estimated first DL channel information and the one or more dominant eigenvectors to form the second DL channel information.

In a sixth implementation form of the node according to the third aspect or any preceding implementation form of the third aspect, the one or more processors further executing the instructions to cause the node to filter or denoise the received channel feedback with channel statistics.

In a seventh implementation form of the node according to the third aspect or any preceding implementation form of the third aspect, the received channel feedback being filtered or denoised with at least one of a MMSE filter of the received channel feedback, a projection of dominant subspaces of the received channel feedback, a MF or MRC based filter of the received channel feedback, or a quadratic program of the received channel feedback.

In an eighth implementation form of the node according to the third aspect or any preceding implementation form of the third aspect, the one or more processors further executing the instructions to cause the node to determine a conditional covariance for the received channel feedback; and filter or denoise, by the node, the received channel feedback in accordance with the conditional covariance.

In a ninth implementation form of the node according to the third aspect or any preceding implementation form of the third aspect, the received channel feedback being filtered or denoised with at least one of a MMSE filter of the received channel feedback, a projection of dominant subspaces of the received channel feedback, a MF or MRC based filter of the received channel feedback, or a quadratic program of the received channel feedback.

In a tenth implementation form of the node according to the third aspect or any preceding implementation form of the third aspect, the second DL channel information comprising a DL precoder.

According to a fourth aspect, a node is provided. The node comprising: a non-transitory memory storage comprising instructions; and one or more processors in communication with the memory storage, wherein the one or more processors execute the instructions to cause the node to: estimate first DL channel information of first DL channels in accordance with reference signals received on first UL channels, the first UL channels being a subset of UL channels, and the first DL channels being associated with the first UL channels; receive channel feedback for a set of DL channels; eigen decompose the first DL channel information; select one or more dominant first eigenvectors of the eigen decomposition of the first DL channel information as a partial precoder; project channel information derived from the channel feedback onto an orthogonal subspace of the first DL channels; select one or more dominant second eigenvectors of the channel information after the projection of the received feedback channel information as second DL channel information of second DL channels, the second DL channels being unassociated with the first UL channels; and combine the partial precoder and the one or more dominant second eigenvectors to form a precoder.

In a first implementation form of the node according to the fourth aspect, the set of DL channels comprising the first DL channels and the second DL channels.

In a second implementation form of the node according to the fourth aspect or any preceding implementation form of the fourth aspect, the reference signals comprising SRS.

In a third implementation form of the node according to the fourth aspect or any preceding implementation form of the fourth aspect, the one or more processors further executing the instructions to cause the node to process the channel feedback after receiving the channel feedback.

In a fourth implementation form of the node according to the fourth aspect or any preceding implementation form of the fourth aspect, the one or more processors further executing the instructions to cause the node to determine a conditional covariance for the channel feedback, the channel feedback being filtered or denoised in accordance with the conditional covariance.

In a fifth implementation form of the node according to the fourth aspect or any preceding implementation form of the fourth aspect, the channel feedback being filtered or denoised with at least one of a MMSE filter of the channel feedback, a projection of dominant subspaces of the channel feedback, a MF or MRC based filter of the channel feedback, or a quadratic program of the channel feedback.

An advantage of a preferred embodiment is that channel estimation is performed utilizing both channel state information (CSI) feedback, which may have quantization errors, and incomplete channel information based on UL channel sounding. The use of both CSI feedback and incomplete channel information based on UL channel sounding helps to overcome the quantization errors present in the CSI feedback, while overcoming limitations associated with obtaining full channel information based on UL channel sounding due to hardware limitations.

Yet another advantage of a preferred embodiment is that channel statistics are utilized to further enhance the accuracy of the channel estimates.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3 illustrates an example user equipment (UE);

FIG. 4 illustrates a flow diagram of example operations occurring in a node communicating using a channel matrix generated in accordance with channel information obtained from both channel state information (CSI) feedback and uplink (UL) reference signals according to example embodiments presented herein;

FIG. 5 illustrates a flow diagram of example operations occurring in a node estimating downlink (DL) channel information with orthogonal subspace projection according to example embodiments presented herein;

FIG. 7 illustrates an example node highlighting circuitry to enhance channel estimation utilizing both a UL channel sounding based technique for determining DL channel information and CSI feedback, where the node improves the quality of the DL channel estimates by processing the CSI feedback according to example embodiments presented herein;

FIG. 8 illustrates an example node highlighting circuitry to enhance channel estimation utilizing both a UL channel sounding based technique for determining DL channel information and CSI feedback, where the node improves the quality of the DL channel estimates by processing the CSI feedback with a conditional covariance according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
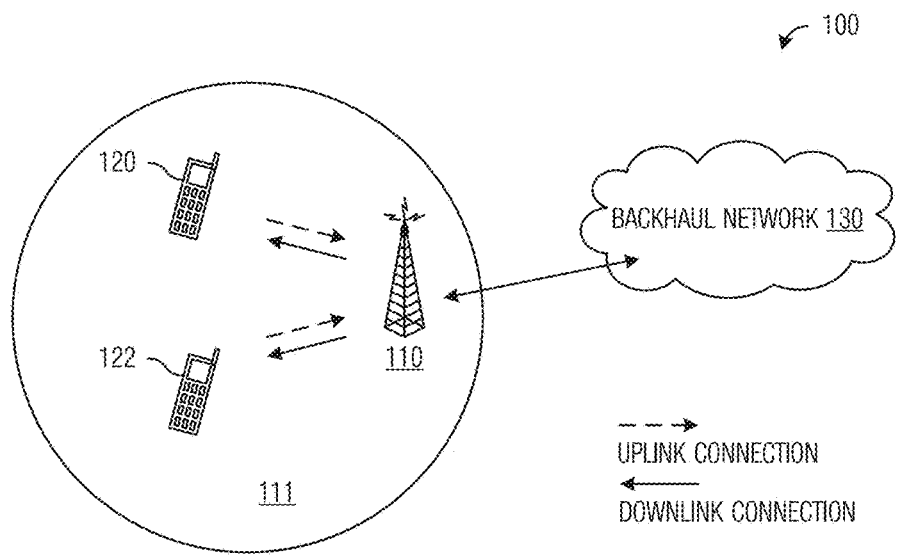
FIG. 1 illustrates an example wireless communication system.

FIG. 1 illustrates an example wireless communication system 100. Communication system 100 includes an access node 110 with coverage area 111. Access node 110 serves a plurality of user equipments (UEs), including UE 120 and UE 122. UEs in the communication system can be in the form of mobile terminals, PCs, tablets, wearable devices (watches, etc.) and other equipment having a capability of communicating wirelessly with an access node. Transmissions from access node 110 to a UE is referred to as a downlink (DL) transmission and occurs over a downlink channel (shown in FIG. 1 as a solid arrowed line 112), while transmissions from a UE to access node 110 is referred to as an uplink (UL) transmission and occurs over an uplink channel (shown in FIG. 1 as a dashed arrowed line 114). Services may be provided to the plurality of UEs by service providers connected to access node 110 through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (IAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well. In some circumstances (such as in sidelink, vehicle-to-vehicle (V2V), vehicle-to-anything (V2X), etc., communications), a UE may operate in an access node like manner. In such situations, UEs may also be referred to as nodes.

Figure 2:
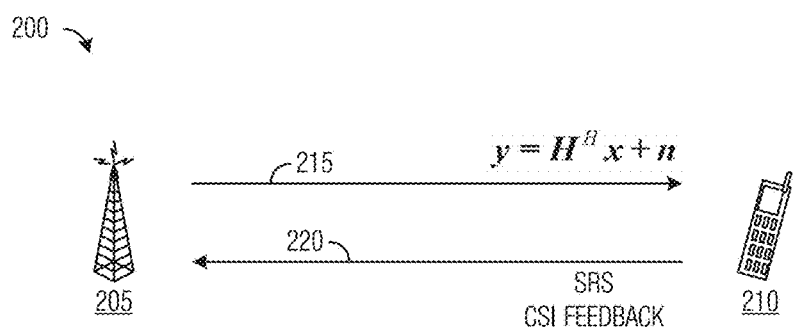
FIG. 2 illustrates an example communications system, providing mathematical expressions of signals transmitted in the communications system.

FIG. 2 illustrates an example communications system 200, providing mathematical expressions of signals transmitted in the communications system. Communications system 200 includes an access node 205 communicating with a UE 210. As shown in FIG. 2, a DL transmission, received at UE 210, is expressible as $$y = H^H x + n$$

where H: $n_T \times n_R$ is the multiple input multiple output (MIMO) channel matrix, $H^H$ is the Hermitian of H, $n_T$ is the number of transmit antennas, $n_R$ is the number of receive antennas, x: $n_T \times 1$ is the transmitted signal vector, y: $n_R \times 1$ is the received signal vector, and n: $n_R \times 1$ is the received noise vector. Additionally, x is the precoding signal, expressible as $$x = Ws,$$

where: W: $n_T \times r$ is the precoding matrix or weights, r is the transmission rank, and s: $r \times 1$ is the vector of transmitted data symbols. The precoding matrix W is selected, in conjunction with the channel matrix H, to maximize the sum data rate, for example.

For DL channel estimation at UE 210, one typical technique involves sending the pilot at each antenna port on one or a set of orthogonal time-frequency resources. Let $h_i'$ be the $i^{th}$ row of H, then the received pilot signal at the UE is expressible as $$y_i = h_i'^H x_i + n, i=1, \ldots, n_T.$$

In this case, the pilots $x_i$ are known to UE 210. It is then possible for UE 210 to determine or estimate $h_i'^H$, from the equation of $y_i$ given above, with i=1, ..., $n_T$, consequently, the whole $H^H$.

Although FIG. 2 depicts only one access node and one UE, communication system 200 is not limited to this case. Multiple UEs may be served by the access node, on different time-frequency resources (such as in FDM-TDM communication systems, as in typical cellular systems) or on the same time-frequency resources (such as in multi-user MIMO (MU-MIMO) communication systems, wherein multiple UEs are paired together and transmissions to each UE are individually precoded).

Other mathematical notation used in the discussion is as follows:

$\hat{r}$: feedback rank;

$\hat{W}$: $n_T \times \hat{r}$ mapped preferred precoding matrix from feedback precoding matrix index (PMI);

$\hat{\gamma}_i$: mapped signal plus interference to noise ratio (SINR) of layer i, i=1, ..., $\hat{r}$, from feedback channel quality indicator (CQI);

$\hat{D}$: $\hat{r} \times \hat{r}$ diagonal matrix with diagonal entries being $\hat{\gamma}_i$;

$\hat{h}_1, \hat{H}_1$: estimated one column or group of columns of DL channel from UL channel sounding. Sometimes replaced with actual values $h_1, H_1$, by assuming good channel estimation with high accuracy;

$\tilde{h}_1$: normalized $\hat{h}_1$;

$\tilde{H}$: approximated channel matrix from CSI feedback;

Z: matrix after projecting $\tilde{H}$ to the orthogonal subspace;

$w_1, W_1$: transmit precoding column or part 1, obtained from SRS estimated channel $\hat{h}_1, \hat{H}_1$;

$w_2, W_2$: transmit precoding column or part 2, obtained from approximated channel and projection;

$R_T$: $n_T \times n_T$ channel spatial covariance at transmitter;

$R_R$: $n_R \times n_R$ channel spatial covariance at receiver;

U: $n_T \times r_{R_T}$ eigenvectors with non-zero eigenvalues; $r_{R_T}$ is the rank of $R_T$;

$U_d$: $n_T \times d$, d dominant eigenvectors from U, $d \leq r_{R_T}$;

$\Lambda$: $r_{R_T} \times r_{R_T}$ diagonal matrix with non-zero eigenvalues $\lambda_i$, i=1, ..., $r_{R_T}$;

C: $r_{R_T} \times r_{R_R}$ independent and identically distributed (i.i.d.) Gaussian complex matrix for fading channel generation;

$\mathcal{A}_{\hat{W}}$: channel subset defined by feedback PMI;

$R_{\hat{W}}$: transmit conditional covariance, conditioned on $\hat{W}$ by the feedback PMI;

$U_{\hat{W}} W$: $n_T \times r_{R_{\hat{W}}}$ eigenvectors with non-zero eigenvalues, $r_{R_{\hat{W}}}$ is the rank of $R_{\hat{W}}$;

$U_{\hat{W},d}$: $n_T \times d$, d dominant eigenvectors from $U_{\hat{W}}$, $d \leq r_{R_{\hat{W}}}$; and $\Lambda_{\hat{W}}$: $r_{R_{\hat{W}}} \times r_{R_{\hat{W}}}$ diagonal matrix with non-zero eigenvalues $\lambda_i$, i=1, ..., $r_{R_{\hat{W}}}$.

As discussed previously, many UEs, especially low-cost UEs, are incapable of simultaneously transmitting using all available antennas, while they are often able of simultaneously receiving using all available antennas. This restriction is due to the UEs having fewer transmit radio frequency (RF) chains than antennas. The limitation may be a cost reducing measure.

FIG. 3 illustrates an example UE 300. As shown in FIG. 3, UE 300 includes two antennas, antenna 305 and antenna 307. UE 300 is capable of simultaneously receiving using both antennas, but UE 300 is capable of simultaneously transmitting only on one antenna due to a limitation on the number of RF transmit chains present in UE 300. Some UEs have switching circuitry that will allow the UEs to transmit on a first antenna and then switch to a second antenna to make a subsequent transmission, for example. However, these UEs are still incapable of simultaneously transmitting using all available antennas and require multiple transmission opportunities to transmit on all antennas.

UE 300 is a specific example of a hardware limited UE, where the UE has Y total antennas that are all capable of simultaneously receiving. However, UE has only X RF transmit chains (where X is less than Y), hence the UE can only simultaneously transmit on X antennas. In order for the UE to transmit over all Y antennas, the UE would require multiple transmission opportunities, enabling the UE to transmit on a first set of X antennas, switch to a second set of X antennas and transmit on the second set of X antennas, and so on.

Additionally, some low-cost UEs do not include switching circuitry that would enable them to switch between different sets of transmit antennas. In such a situation, these UEs would only be able to transmit on a particular set of antennas, and not be able to switch to other antennas. The example embodiments presented herein are focused on these low-cost UEs. However, the example embodiments are also applicable to UEs with switching circuitry, but for are not switching transmit antennas. Perhaps due to time constraints, for example.

A first technique that may be used to obtain information about a DL channel is CSI feedback. CSI feedback is typically used in FDD communication systems. In CSI feedback, an access node transmits reference signals (such as CSI reference signals (CSI-RS)), which are used by a UE that receives the reference signals to make measurements of the DL channels. The UE generates channel information from the measurements and reports the channel information to the access node. The channel information that is reported to the access node includes:

Rank feedback $\hat{r}$;
PMI feedback $\hat{W}=[\hat{w}_1, \ldots, \hat{w}_{\hat{r}}]$; and
CQI feedback $\gamma_1, \ldots, \gamma_{\hat{r}}$.

However, CSI feedback is quantized to reduce communication overhead, and the quantization of the channel information results in quantization error. Quantization error is the difference between an actual value and its quantized value. The quantization error reduces the accuracy of the channel information reported by the UE; leading to errors in the channel estimation determined from the channel information.

A second technique that may be used to obtain information about a DL is utilizing channel reciprocity on channel measurements based on UL channel sounding. The UL channel sounding based technique is usually used in TDD communication systems. In the UL channel sounding based technique, a UE transmits reference signals (e.g., sounding reference signals (SRSs)), which are used by an access node that receives the reference signals to make measurements of the UL channels. The access node generates channel information for the DL channels from the measurements. Because in TDD communication systems the UL channels and the DL channels share a common frequency band, channel reciprocity enables the measurements made on the UL channels to apply to the DL channels.

However, because some UEs, especially low-cost UEs, are incapable of simultaneously transmitting on all antennas, the access node is not able to make measurements of all of the UL channels in a single transmission opportunity. Hence, the access node is unable to generate channel information for all of the DL channels.

A complete channel matrix is expressible as $$H=[h_1, \ldots, h_{N_R}].$$

However, in the UL channel sounding based technique involving UEs with the hardware constraint that limits the number of simultaneous transmissions the UEs are able to make, the access node is only able to make measurements of a subset of the total number of UL channels. In other words, the channel information for the DL channels that is not associated with the UL channels over which the UE transmitted the reference signals is missing. Hence, the channel information for the DL channels is expressible as $$[h_{s_1}, h_{s_2}, \ldots]$$

where $s_1, s_2, \ldots \in \{1, \ldots, N_R\}$.

When the channel information for the DL channels is determined based on CSI feedback, the following information is available Rank feedback $\hat{r}$;
PMI feedback $\hat{W}=[\hat{w}_1, \ldots, \hat{w}_{\hat{r}}]$; and
CQI feedback $\gamma_1, \ldots, \gamma_{\hat{r}}$, where the CQI feedback is the quantized signal to noise ratio (SNR) for each layer. Additionally, in 3GPP LTE or 5G, the CQI feedback corresponds to one codeword that may be mapped to multiple layers. Then, for these layers, the CQI values will be the same. As an example, with rank 4, in 3GPP LTE, $\gamma_1=\gamma_2$ and $\gamma_3=\gamma_4$, and for 5G, $\gamma_1=\gamma_2=\gamma_3=\gamma_4$.

According to an example embodiment, methods and apparatus for enhancing channel estimation utilizing both the UL channel sounding based technique for determining information for the DL channels and the CSI feedback are provided. Utilizing both the UL channel sounding based technique and the CSI feedback to perform channel estimation helps to overcome the quantization error present in the channel information reported in the CSI feedback, as well as the missing information for the DL channels not associated with the UL channels over which the UE transmitted reference signals.

In an embodiment, the channel information for the DL channels derived from the CSI feedback is projected onto an orthogonal subspace of the DL channels associated with the UL channels over which the UE transmitted reference signals. Projecting the channel information for the DL channels derived from the CSI feedback onto the orthogonal subspace of the DL channels associated with the UL channels over which the UE transmitted reference signals provides an estimate of the channel information of the DL channels not associated with the UL channels over which the UE transmitted reference signals. The orthogonal projection helps to reduce the quantization error that is present in the CSI feedback, which would degrade performance.

In an embodiment, one or more dominant eigenvectors of the orthogonal projection is selected as the channel information of the DL channels not associated with the UL channels over which the UE transmitted reference signals.

In an embodiment, the combination of the channel information of the DL channels associated with the UL channels over which the UE transmitted reference signals and the one or more dominant eigenvectors of the orthogonal projection is used as the channel matrix H. The one or more dominant eigenvectors of the orthogonal project may be used as the channel information missing due to UE's inability to transmit reference signals using all of its antennas.

For discussion purposes, consider a rank 2 link between an access node and a UE, but the UE has only one transmit RF chain and two antennas. Therefore, the UE can only transmit reference signals on one of its two antennas. The limitation may be due to hardware limitations, e.g., a single transmit RF chain or no switching circuitry. Hence, the UE can transmit only on one antenna in a single transmission opportunity. The channel matrix H is expressible as $H=[h_1, h_2]$. The channel information determined from the reference signals transmitted by the UE is denoted $\hat{h}_1$. It is assumed that there is no channel estimation error in determining the channel information based on the reference signals transmitted by the UE. Therefore, $h_1=\hat{h}_1$. Although the discussion focuses on the first of two antennas being used by the UE to transmit reference signals, the example embodiments are operable with the second of two antennas being used by the UE to transmit reference signals.

The CSI feedback reported by the UE is denoted: rank $\hat{r}_k=2$, PMI $\hat{W}=[\hat{w}_1, \hat{w}_2]$, and CQI $\gamma_1, \gamma_2$.

It is possible to find a better matrix W to improve the sum rate, i.e., $$R=\log_2 \det(I+W^H HH^H W),$$

where R is the sum rate. In other words, W is the precoding matrix used to precode transmissions transmitted over the rank two link.

Ideally, W is the semi-unitary matrix arising from the singular value decomposition (SVD) of H. W may be expressed as $$W = [\frac{\hat{h}_1}{|\hat{h}_1|} \; w_2].$$

Therefore, because $\hat{h}_1$ is known (the channel information determined from the reference signals transmitted by the UE), only $w_2$ needs to be determined to find W.

Assuming that $w_2$ is on the orthogonal subspace of $h_1$, $\hat{H}$ is the estimated channel matrix determined from the CSI feedback and is expressible as $$\hat{H}=\hat{W}\cdot\hat{D}^{1/2} \text{ and } \hat{\Lambda}=\text{diag}\{[\gamma_1,\gamma_2]\}.$$

The channel matrix from the CSI feedback, projected onto the orthogonal subspace of $h_1$, is expressible as $$Z = \left(I - \tilde{h}_1 \tilde{h}_1^H\right)\hat{H} \text{ and } \tilde{h}_1 = \frac{\hat{h}_1}{\|\hat{h}_1\|}.$$

Then the one or more dominant eigenvectors of Z is selected as the solution for $w_2$. With the solution for $w_2$ found, the precoding matrix W is known. Transmissions from the access node may be precoded using W and transmitted over the rank 2 link to the UE.

In general, consider a rank M link (where M is greater than or equal to 2) between an access node and a UE, but the UE does not have as many transmit RF chains as antennas. Therefore, the UE can only transmit reference signals on a subset of its antennas. The channel matrix H is expressible as $H=[H_1 \; H_2]$, where $H_1$ is the channel information determined from the reference signals transmitted by the UE, and $H_2$ is missing. It is assumed that there is no channel estimation error in determining the channel information based on the reference signals transmitted by the UE. Therefore, $H_1=\hat{H}_1$.

The channel matrix derived from CSI feedback is expressible as $$\hat{H}=\hat{W}\cdot\hat{D}^{1/2},$$

where $$\hat{D} = \begin{bmatrix} \gamma_1 & & 0 \\ & \ddots & \\ 0 & & \gamma_{\hat{r}} \end{bmatrix}.$$

Ideally, W is the semi-unitary matrix arising from the SVD of H. W may be expressed as $$W=[W_1 W_2],$$

where $W_1$ are the dominant eigenvectors of $H_1$. Therefore, because $\hat{H}_1$ is known (the channel information determined from the reference signals transmitted by the UE), $W_1$ is known, and only $W_2$ needs to be determined to find W.

The channel matrix from the CSI feedback, projected onto the orthogonal subspace of $H_1$, is expressible as $$Z=(I-H_1 H_1^\dagger)\hat{H} \text{ and } H_1^\dagger=(H_1^H H_1)^{-1} H_1^H.$$

Then the one or more dominant eigenvectors of Z is selected as the solution for $W_2$. With the solution for $W_2$ found, the precoding matrix W is known. Transmissions from the access node may be precoded using W and transmitted over the rank M link to the UE.

Alternatively, it is possible to take some dominant eigen directions of $H_1$, and $W_1$, and project $\hat{H}$ onto the orthogonal subspace of $W_1$. Then, the eigen decomposition of $H_1$ is expressible as $$H_1=V_1 D_1^{1/2} V_1^H,$$

and select $d_1$ dominant eigenvectors from $V_1$ and form $W_1$.

With the projection onto the orthogonal subspace being defined as $$Z=(I-W_1 W_1^H)\hat{H},$$

the $d_2$ dominate eigenvectors of Z are selected as the solution for $W_2$. The final solution for W is $W=[W_1 \; W_2]$, as stated above. The sizes $d_1$ and $d_2$ may be determined based on the eigenvalues of $H_1$ and Z, as well as the overall rank of W.

FIG. 4 illustrates a flow diagram of example operations 400 occurring in a node communicating with, for example, other nodes or UEs, using a channel matrix generated in accordance with channel information obtained from both CSI feedback and UL reference signals. Operations 400 may be indicative of operations occurring in a node as the node communicates using a channel matrix generated in accordance with channel information obtained from both CSI feedback and UL reference signals. The node may be an access node making a DL transmission or some other device estimating the DL channel for the access node making the DL transmission.

Operations 400 begin with the node estimating DL channels in accordance with reference signals received on UL channels (block 405), such as received from a UE. The node may make measurements of the UL channels conveying the reference signals (e.g., SRS) and estimate the UL channels based on the channel measurements. Utilizing channel reciprocity, the node is able to estimate the DL channels that correspond to the UL channels. However, due to UE limitations (where the UE is incapable of transmitting on all UL channels, for example), the node may not be able to estimate all of the DL channels. Therefore, the DL channel estimates using the UL reference signals are referred to as partial channel measurements. As an example, if the UE is only able to simultaneously transmit on two UL channels, the node is able to estimate only two DL channels that correspond to the two UL channels, independent of the total number of DL channels between the node and the UE.

The node receives CSI feedback (block 407). The CSI feedback may be received from the UE. The CSI feedback may include a rank indicator, PMI feedback, and CQI feedback. The CSI feedback may be quantized to reduce communication overhead. The CSI feedback may be optionally filtered or denoised (block 409). The filtering or denoising of the CSI feedback may be performed by the node or another device in the communication system. Filtering or denoising the CSI feedback improves the quality of the estimation of the DL channels. The filtering or denoising of the CSI feedback may utilize channel statistics, such as conditional covariance or correlation, or instantaneous fading channel. A detailed discussion of filtering or denoising the CSI feedback is provided below.

The node estimates the DL channels with orthogonal subspace projections (block 411). The node uses the CSI feedback and the DL channel estimates based on the UL reference signals to estimate the DL channel. The CSI feedback (which are quantized) and the DL channel estimates based on the UL reference signals (which are partial in nature) are used to approximate all of the DL channels. As an example, the node projects the quantized DL channel estimates (from the CSI feedback) onto an orthogonal subspace of the DL channels estimated based on the UL reference signals to estimate DL channels not estimated in accordance with the UL reference signals.

The node communicates using the DL channel information (block 413). The DL channel information comprises DL channel estimates based on the UL reference signals (as obtained in block 405, for example) and DL channel estimates of DL channels not associated with the UL channels conveying reference signals. As an example, the node precodes data being transmitted with a precoder derived from the DL channel information and transmits the precoded data.

FIG. 5 illustrates a flow diagram of example operations 500 occurring in a node estimating DL channel information with orthogonal subspace projection. Operations 500 may be indicative of operations occurring in a node as the node estimates DL channel information with an orthogonal subspace projection. Operations 500 may be an example implementation of block 411 of FIG. 4.

The node generates a partial precoder using channel information derived based on the UL reference signals (block 505). As discussed previously, W is the semi-unitary matrix arising from the SVD of H, and W may be expressed as W=[$W_1$ $W_2$], where $W_1$ are the dominant eigenvectors of $H_1$, which are determined from the UL reference signals transmitted by the UE and are known.

The node projects the channel information provided by the CSI feedback ($\hat{H} = \hat{W} \cdot \hat{D}^{1/2}$) onto the orthogonal subspace of $H_1$ (block 507). Projecting the channel information provided by the CSI feedback (which is complete, but may include errors due to the quantization process used to reduce communication overhead) onto the orthogonal subspace helps to mitigate the impact of the quantization error. The projection onto the orthogonal subspace is expressible as $Z=(I-H_1 H_1^\dagger)\hat{H}$, where $H_1^\dagger = (H_1^H H_1)^{-1} H_1^H$. The node identifies dominant eigenvector of Z (block 509). The dominant eigenvectors of Z are identified and used as the solution for the remainder of the precoder W. In other words, the dominant eigenvectors of Z are used as the solution for $W_2$. In an embodiment, a number of dominant eigenvectors of Z identified is equal to the number of DL channels lacking channel information estimates (i.e., the number of columns of $W_2$). As an example, if there is a total of three DL channels and the UE is only able to transmit using one transmit RF chain, then there are two DL channels lacking channel information estimates (because there is only one DL channel with channel information derived for UL reference signals). In such a situation, the two dominant eigenvectors of Z are identified and used as the solution for $W_2$.

In an embodiment, dominant eigen directions of the precoder and the DL channel information derived from UL reference signals are used rather than the actual precoder and DL channel information in orthogonal subspace projection. Utilizing the dominant eigen directions may help to simplify the orthogonal subspace projection.

Figure 6:
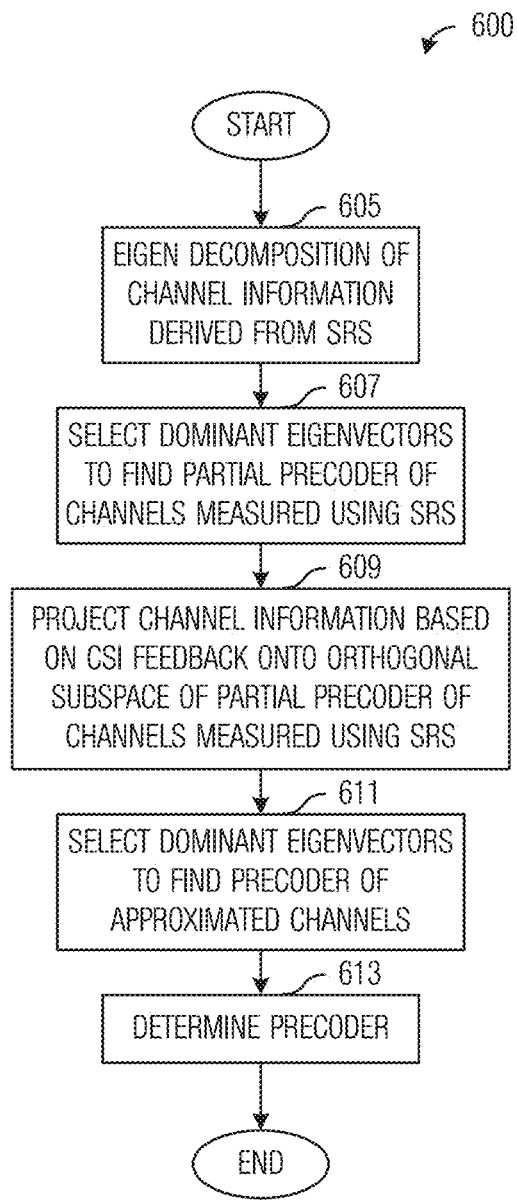
FIG. 6 illustrates a flow diagram of example operations occurring in a node determining a precoder for DL channels in accordance with estimated channel information according to example embodiments presented herein.

FIG. 6 illustrates a flow diagram of example operations 600 occurring in a node determining a precoder for DL channels in accordance with estimated channel information. Operations 600 may be indicative of operations occurring in a node as the node determines a precoder for DL channels in accordance with estimated channel information. Operations 600 may be an example implementation of block 411 of FIG. 4.

Operations 600 begin with the node performing the eigen decomposition of the channel information of the DL channels derived from UL reference signals, $H_1$ (block 605). The eigen decomposition of $H_1$ may be expressed as $H_1 = V_1 D_1^{1/2} V_1^H$. The node selects the $d_1$ dominant eigenvectors from $V_1$ and forms $W_1$, where $d_1$ is the number of DL channels derived from the UL reference signals (block 607).

The node projects the channel information provided by the CSI feedback ($\hat{H} = \hat{W} \cdot \hat{D}^{1/2}$) onto the orthogonal subspace of $W_1$ (block 609). Projecting the channel information provided by the CSI feedback (which is complete, but may include errors due to the quantization process used to reduce communication overhead) onto the orthogonal subspace helps to mitigate the impact of the quantization error. The projection onto the orthogonal subspace is expressible as $Z=(I-W_1 W_1^H)\hat{H}$. The node selects the dominant eigenvectors of Z as the solution for $W_2$ (block 611). In an embodiment, the node selects the $d_2$ dominant eigenvectors as the solution for $W_2$, where $d_2$ is the number of DL channels not associated with the UL reference signals. The precoder for the DL channels is determined as W=[$W_1$ $W_2$] (block 613).

In an embodiment, the CSI feedback may be processed to improve the quality of the estimation of the DL channels. The processing of the CSI feedback includes filtering or denoising using channel statistics, such as channel covariance or correlation, or instantaneous fading channel. As an example, the impact of the channel covariance or correlation on the sum rate at the transmitter is expressible as an eigen decomposition $$R_T = U \Lambda U^H.$$

While for the instantaneous fading channel, the channel information is expressible as $$H = R_T^{1/2} C R_R^{1/2}.$$

Under the assumption that there is no receive correlation, C is an i.i.d. random matrix, allowing the channel information to be re-expressed as $$H = U \Lambda^{1/2} C.$$

The same correlations may be applicable to any channel vector at any receive antenna at the UE. Furthermore, for most situations, R is not a full rank matrix, $\Lambda$ comprises the non-zero eigenvalues, and U is then a semi-unitary matrix. In an embodiment, the dominant eigenvalues may be selected.

FIG. 7 illustrates an example node 700 highlighting circuitry to enhance channel estimation utilizing both a UL channel sounding based technique for determining DL channel information and CSI feedback, where node 700 improves the quality of the DL channel estimates by processing the CSI feedback. Examples of the processing include filtering, denoising, or both filtering and denoising.

Node 700 includes a CSI feedback processing unit 705 configured to perform processing of the CSI feedback received by node 700. As an example, CSI feedback processing unit 705 filters, denoises, or filters and denoises the CSI feedback received by node 700. The processed CSI feedback, denoted $\hat{H}$, is refined version of the channel information reported in the CSI feedback, which is quantized and may include quantization error. The processed CSI feedback $\hat{H}$ generally has less quantization error (when compared to the CSI feedback that has not been processed) due to the processing performed by CSI feedback processing unit 705, which may average, filter, or smooth out the channel information reported in the CSI feedback, for example.

Node 700 also includes a projection unit 707 configured to project channel information (e.g., the processed CSI feedback $\hat{H}$) on the orthogonal subspace of the channel information derived from UL reference signals $H_1$ (such as in block 507 of FIG. 5 or block 609 of FIG. 6). Node 700 further includes a selection unit 709 configured to select one or more dominant eigenvectors of the projection Z provided by projection unit 707. The number of dominant eigenvectors selected by selection unit 709 may be dependent on the number of DL channels not associated with UL channels conveying UL reference signals. In other words, selection unit 709 selects a number of dominant eigenvectors equal to the number of DL channels that are without channel information derived from UL reference signals.

Example processing performed by CSI feedback processing unit 705 includes, but is not limited to:

Minimum mean square error (MMSE) filtering;
Denoising via projection of dominant subspaces;
Maximum fairness (MF)/maximum ratio combining (MRC) based filtering;
Quadratic programming.

As related to MMSE or linear MMSE (LMMSE) filtering, with CSI feedback, the signal model for the feedback PMI with quantization noise is expressible as $\hat{W}\hat{D}^{1/2} = U\Lambda^{1/2}C + N$.

After MMSE or LMMSE filtering, the fading channel at the receiver (denoted $\hat{C}$) and the processed CSI feedback (denoted $\hat{H}$) are expressible as $$\hat{C} = \Lambda^{\frac{1}{2}} U^H (R + \sigma^2 I)^{-1} \hat{W} \cdot \hat{D}^{1/2}, \text{ and}$$

$$\hat{H} = U\Lambda^{1/2}\hat{C} = R(R + \sigma^2 I)^{-1} \hat{W} \cdot \hat{D}^{1/2}.$$

A projection on the orthogonal subspace of the channel information derived from UL reference signals $H_1$, determined by projection unit 707, is expressible, for example, as $Z = (I - \tilde{h}_1 \tilde{h}_1^H)\hat{H}$.

Selection unit 709 selects the one or more dominant eigenvectors of Z as the solution for $W_2$.

As related to denoising via projection of dominant subspaces, a projection of the dominant eigenspaces of the covariance (performed by CSI feedback processing unit 705, for example) is expressible as $P_R = U_d U_d^H$.

The CSI feedback may be denoised with the projection (again, by CSI feedback processing unit 705, for example), resulting in the processed CSI feedback $\hat{H}$ $\hat{H} = P_R \cdot \hat{W} \cdot \hat{D}^{1/2}$.

Projection unit 707 projects the processed CSI feedback $\hat{H}$ on orthogonal subspace of the channel information derived from UL reference signals $H_1$, which may be expressed, for example, as $Z = (I - \tilde{h}_1 \tilde{h}_1^H)\hat{H}$.

Selection unit 709 selects the one or more dominant eigenvectors of Z as the solution for $W_2$.

As related to MF/MRC based filtering, a quantization model is expressible as $\hat{W}\hat{D}^{1/2} = U\Lambda^{1/2}C + N$.

CSI feedback processing unit 705 may denoise the CSI feedback using a MRC filter, and the fading channel at the receiver (denoted $\hat{C}$) and the processed CSI feedback (denoted $\hat{H}$) are expressible as $$\hat{C} = \Lambda^{\frac{1}{2}} U^H \hat{W} \cdot \hat{D}^{1/2}, \text{ and}$$

$$\hat{H} = U\Lambda^{1/2}\hat{C} = R \cdot \hat{W} \cdot \hat{D}^{1/2}.$$

Projection unit 707 projects the processed CSI feedback $\hat{H}$ on orthogonal subspace of the channel information derived from UL reference signals $H_1$, which may be expressed, for example, as $Z = (I - \tilde{h}_1 \tilde{h}_1^H)\hat{H}$.

Selection unit 709 selects the one or more dominant eigenvectors of Z as the solution for $W_2$.

As related to quadratic programming, high rank channel reconstruction may be performed. The channel reconstruction may be expressed as $$\max_{C'} \left\| H \hat{W} \hat{D}^{1/2} \right\|^2 = \left\| C'^H \Lambda^{1/2} U^H \hat{W} \hat{D}^{1/2} \right\|^2$$

$$-> \max_{C'} Tr\left\{ C'^H \Lambda^{1/2} U^H \hat{W} \hat{D} \hat{W}^H U \Lambda^{1/2} C' \right\}.$$

Assume that C' is semi-unitary, i.e., C' is the dominant eigenvectors of $\Lambda^{1/2} U^H \hat{W} \hat{D} \hat{W}^H U \Lambda^{1/2}$, then the channel may be reconstructed as $\hat{H} = U\Lambda^{1/2}\hat{C}$.

Projection unit 707 projects the processed CSI feedback $\hat{H}$ on orthogonal subspace of the channel information derived from UL reference signals $H_1$, which may be expressed, for example, as $Z = (I - \tilde{h}_1 \tilde{h}_1^H)\hat{H}$.

Selection unit 709 selects the one or more dominant eigenvectors of Z as the solution for $W_2$.

Some or all of CSI feedback processing unit 705, projection unit 707, and selection unit 709 may be implemented in software executing in one or more processors, one or more integrated circuits (such as field programmable logic arrays (FPGAs) or application-specific integrated circuits (ASICs)), etc. In performance critical implementations, computationally heavy portions may be implemented as integrated circuits that operate in cooperation with software executing on one or more processors.

In an embodiment, the CSI feedback may be processed with a conditional covariance to improve the quality of the estimation of the DL channels. In situations when there is CSI feedback, the channel is not independent from the feedback PMI. Then, it is possible to consider the following conditional covariance (which is conditional on the feedback PMI) for a channel set with given feedback $\hat{W}$ $$\mathcal{A}_{\hat{W}} \triangleq \{H \in C^{n_T \times n_R}: R(H, \hat{W}) \geq R(H, W), W \in C, h_i(\ )C(\ 0, R)\}$$

$$R_{\hat{W}} \triangleq E\{HH^H | H \in \mathcal{A}_{\hat{W}}\}.$$

The eigen decomposition of $R_{\hat{W}}$ is expressible as $$R_{\hat{W}} = U_{\hat{W}} \Lambda_{\hat{W}} U_{\hat{W}}^H.$$

FIG. 8 illustrates an example node 800 highlighting circuitry to enhance channel estimation utilizing both a UL channel sounding based technique for determining DL channel information and CSI feedback, where node 800 improves the quality of the DL channel estimates by processing the CSI feedback with a conditional covariance. Examples of the processing include filtering, denoising, or both filtering and denoising.

Node 800 includes a covariance unit 805 configured to determine a conditional covariance for the feedback PMI (denoted $R_{\hat{W}}$). As an example, the CSI feedback defines a subset of channels that is measured to derive the feedback reported by the CSI feedback. Therefore, the channel statistics may be a covariance that is conditional on the CSI feedback (in particular, the PMI feedback portion of the CSI feedback).

Node 800 also includes a CSI feedback processing unit 807 configured to perform processing of the CSI feedback received by node 800. As an example, CSI feedback processing unit 807 filters, denoises, or filters and denoises the CSI feedback received by node 800 in combination with the conditional covariance provided by covariance unit 805. The processed CSI feedback, denoted $\hat{H}$, is refined version of the channel information reported in the CSI feedback, which is quantized and may include quantization error. The processed CSI feedback $\hat{H}$ generally has less quantization error due to the processing performed by CSI feedback processing unit 807, which may average or smooth out the channel information reported in the CSI feedback, for example.

Node 800 also includes a projection unit 809 configured to project channel information (e.g., the processed CSI feedback $\hat{H}$) on the orthogonal subspace of the channel information derived from UL reference signals $H_1$ (such as in block 507 of FIG. 5 or block 609 of FIG. 6). Node 800 further includes a selection unit 811 configured to select one or more dominant eigenvectors of the projection Z provided by projection unit 809. The number of dominant eigenvectors selected by selection unit 811 may be dependent on the number of DL channels not associated with UL channels conveying UL reference signals. In other words, selection unit 811 selects a number of dominant eigenvectors equal to the number of DL channels that are without channel information derived from UL reference signals.

Example processing performed by CSI feedback processing unit 807 includes, but is not limited to:

Minimum mean square error (MMSE) filtering with the conditional covariance;

Denoising via projection of dominant subspaces with the conditional covariance;

Maximum fairness (MF)/maximum ratio combining (MRC) based filtering with the conditional covariance;

Quadratic programming with the conditional covariance.

The discussion of the example processing performed by CSI feedback processing unit 807 of FIG. 8 presented above also apply when the conditional covariance is used to further enhance the feedback. However, the general covariance matrix presented previously is replaced with a conditional matrix.

Some or all of covariance unit 805, CSI feedback processing unit 807, projection unit 809, and selection unit 811 may be implemented in software executing in one or more processors, one or more integrated circuits (such as FPGAs or ASICs), etc. In performance critical implementations, computationally heavy portions may be implemented as integrated circuits that operate in cooperation with software executing on one or more processors.

As related to MMSE or linear MMSE (LMMSE) filtering, the processed CSI feedback is expressible as $$\hat{H} = R_{\hat{W}}(R_{\hat{W}} \sigma^2 I)^{-1} \hat{W} \cdot \hat{D}^{1/2}.$$

As related to denoising via projection of dominant subspaces, a projection on the orthogonal subspace is expressible as $$P_{R_{\hat{W}}} = U_{\hat{W},d} U_{\hat{W},d}^H$$

$$\hat{H} = P_{R_{\hat{W}}} \cdot \hat{W} \cdot \hat{D}^{1/2}.$$

As related to MF/MRC based filtering, the processed CSI feedback is expressible as $$\hat{H} = P_{\hat{W}} \cdot \hat{W} \cdot \hat{D}^{1/2}$$

As related to quadratic programming, the dominant eigenvectors are expressible as $$\hat{C}_{\hat{W}} \propto \text{eigenvectors of } (\Lambda_{\hat{W}}^{1/2} U_{\hat{W}}^H \hat{W} \hat{D} \hat{W}^H U_{\hat{W}} \Lambda_{\hat{W}}^{1/2},$$

and $$\hat{H} = U_{\hat{W}} \cdot \Lambda_{\hat{W}}^{1/2} \cdot \hat{C}_{\hat{W}}.$$

Performance evaluation of the example embodiments were performed utilizing the following model:

Access node: 8 transmit antenna;
UE: 2 receive antenna;
Channel model:
Scattering channel model,
  Angle spread 15 degrees, random central, uniform power distribution along ring,
  Access node—cross polarized antennas, cross polarization correlation γ=0.3,
  UE—antenna correlation 0;
Conditional covariance generation: Monte Carlo;
Measurement:

$$\text{Rate } R = \log_2 \det(I + W^H H H^H W);$$

Given channel covariance R and codebook C, obtain the conditional covariance as:

Eigen decomposition of R and nonzero eigen mode $$R = U \Lambda U^H,$$

Generate N samples of {H} according to $$H = U \Lambda^{1/2} C,$$

where $c_{ij}$ in C is i.i.d. complex Gaussian with unit variance,

For each H, search the PMI in codebook C based on a certain criterion, e.g., MIMO capacity. With the resulting matrix W, put the channel H to the set $\mathcal{A}_W$.

For each set $\mathcal{A}_W$ W∈C, a conditional covariance $R_{\hat{W}}$ is obtained by averaging of $HH^H H \in \mathcal{A}_W$.

Figure 9A:
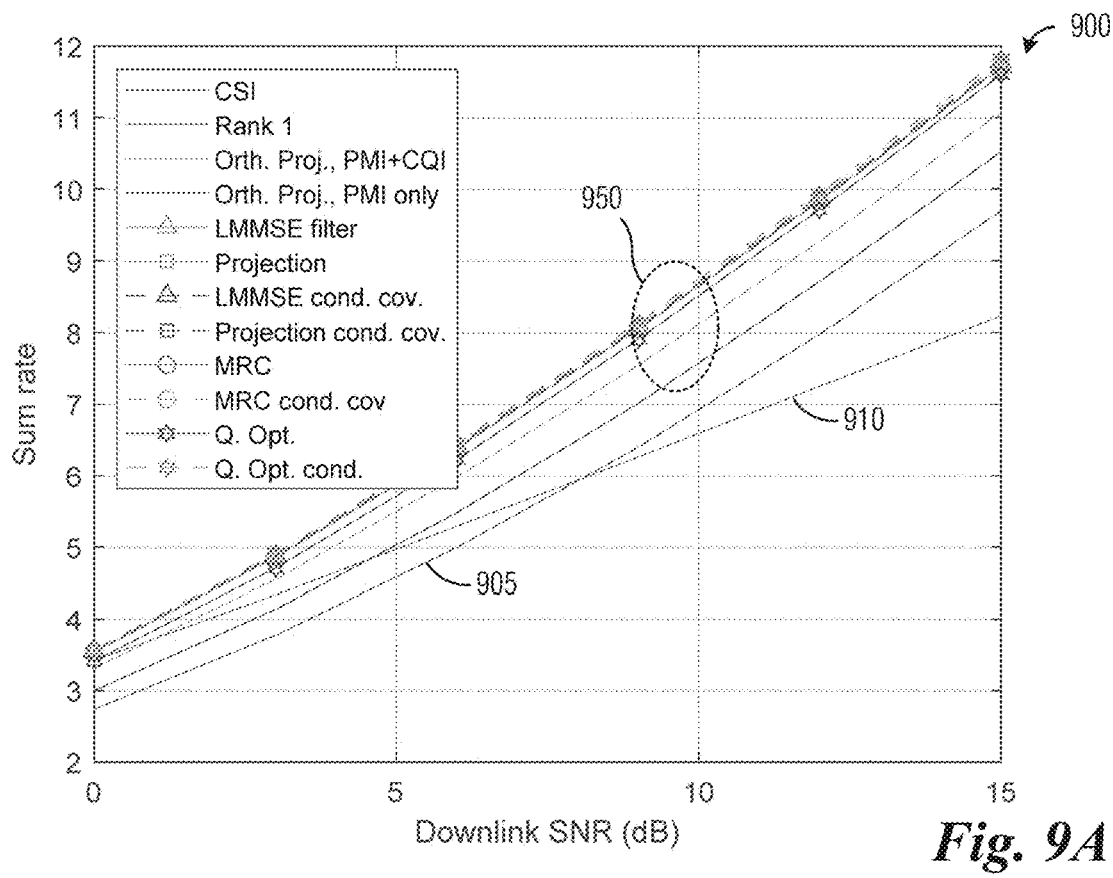
FIGS. 9A-9B illustrate data plots of downlink signal to noise ratio (SNR) vs sum rate R, comparing the embodiment techniques with CSI feedback only channel information according to example embodiments presented herein.

FIG. 9A illustrates a data plot 900 of downlink SNR vs sum rate R, comparing the embodiment techniques with CSI feedback only channel information. As shown in FIG. 9A, the sum rate R for CSI feedback only (line 905) and a rank 1 channel (line 910) is below the embodiment techniques for most values of downlink SNR. Most of the embodiment techniques perform similarly and for any given downlink SNR lie within a region, such as region 950.

Figure 9B:
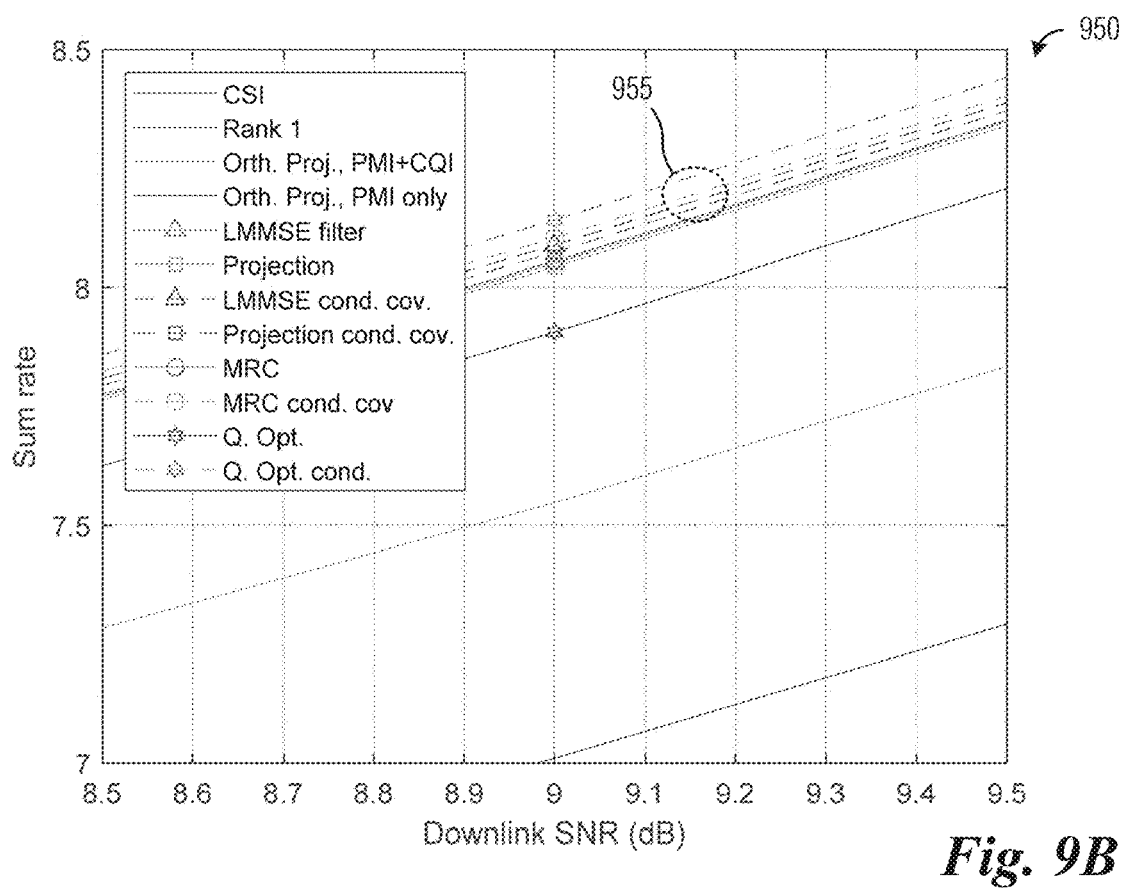

FIG. 9B illustrates a detailed view of region 950 of data plot 900. Region 950 is shown in greater detail in FIG. 9B. As shown in FIG. 9B, the embodiment techniques that feature conditional covariance processing offer higher sum rate R (e.g., highlight 955) than the embodiment techniques that to do not utilize conditional covariance.

Figure 10:
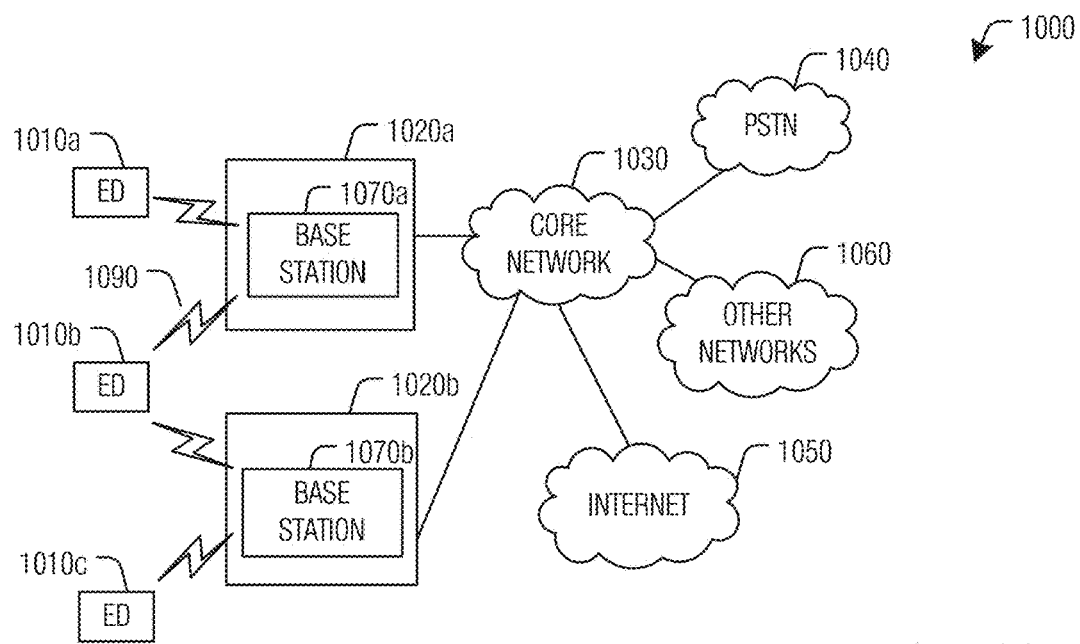
FIG. 10 illustrates an example communication system according to example embodiments presented herein.

FIG. 10 illustrates an example communication system 1000. In general, the system woo enables multiple wireless or wired users to transmit and receive data and other content. The system 1000 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system woo includes electronic devices (ED) 1010a-1010c, radio access networks (RANs) 1020a-1020b, a core network 1030, a public switched telephone network (PSTN) 1040, the Internet 1050, and other networks 1060. While certain numbers of these components or elements are shown in FIG. 10, any number of these components or elements may be included in the system 1000.

The EDs 1010a-1010c are configured to operate or communicate in the system 1000. For example, the EDs 1010a-1010c are configured to transmit or receive via wireless or wired communication channels. Each ED 1010a-1010c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1020a-1020b here include base stations 1070a-1070b, respectively. Each base station 1070a-1070b is configured to wirelessly interface with one or more of the EDs 1010a-1010c to enable access to the core network 1030, the PSTN 1040, the Internet 1050, or the other networks 1060. For example, the base stations 1070a-1070b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1010a-1010c are configured to interface and communicate with the Internet 1050 and may access the core network 1030, the PSTN 1040, or the other networks 1060.

In the embodiment shown in FIG. 10, the base station 1070a forms part of the RAN 1020a, which may include other base stations, elements, or devices. Also, the base station 1070b forms part of the RAN 1020b, which may include other base stations, elements, or devices. Each base station 1070a-1070b operates to transmit or receive wireless signals within a particular geographic region or area, sometimes referred to as a "cell." In some embodiments, multiple-input multiple-output (MIMO) technology may be employed having multiple transceivers for each cell.

The base stations 1070a-1070b communicate with one or more of the EDs 1010a-1010c over one or more air interfaces 1090 using wireless communication links. The air interfaces 1090 may utilize any suitable radio access technology.

It is contemplated that the system 1000 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1020a-1020b are in communication with the core network 1030 to provide the EDs 1010a-1010c with voice, data, application, Voice over Internet Protocol (VoIP), or other services. Understandably, the RANs 1020a-1020b or the core network 1030 may be in direct or indirect communication with one or more other RANs (not shown). The core network 1030 may also serve as a gateway access for other networks (such as the PSTN 1040, the Internet 1050, and the other networks 1060). In addition, some or all of the EDs 1010a-1010c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1050.

Although FIG. 10 illustrates one example of a communication system, various changes may be made to FIG. 10. For example, the communication system 1000 could include any number of EDs, base stations, networks, or other components in any suitable configuration.

Figure 11A:
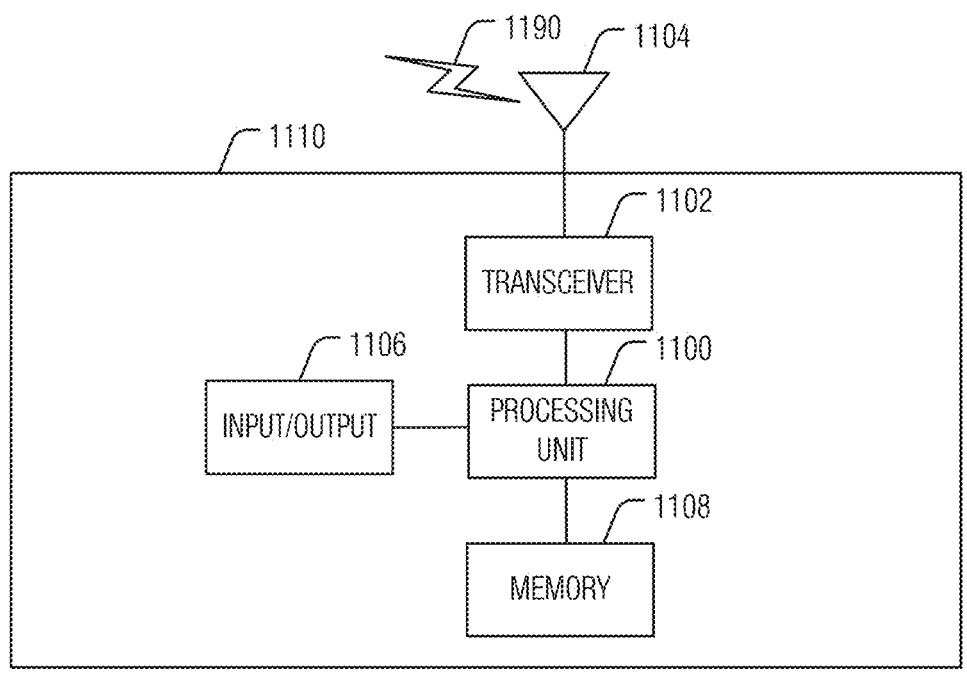
FIGS. 11A and 11B illustrate example devices that may implement the methods and teachings according to this disclosure.
Figure 11B:
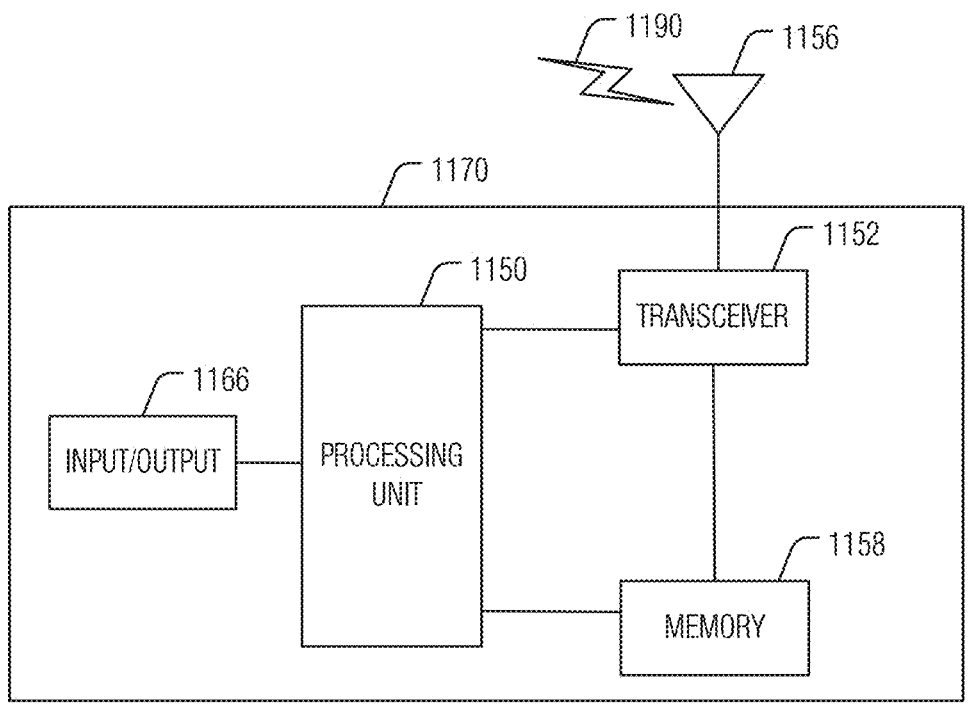

FIGS. 11A and 11B illustrate example devices that may implement the methods and teachings according to this disclosure. In particular, FIG. 11A illustrates an example ED 1110, and FIG. 11B illustrates an example base station 1170. These components could be used in the system 1000 or in any other suitable system.

As shown in FIG. 11A, the ED 1110 includes at least one processing unit 1100. The processing unit 1100 implements various processing operations of the ED 1110. For example, the processing unit 1100 could perform signal coding, data processing, power control, input/output processing, or any other functionality enabling the ED 1110 to operate in the system 1000. The processing unit 1100 also supports the methods and teachings described in more detail above. Each processing unit 1100 includes any suitable processing or computing device configured to perform one or more operations. Each processing unit 1100 could, for example, include a microprocessor, microcontroller, digital signal processor, field programmable gate array, or application specific integrated circuit.

The ED 1110 also includes at least one transceiver 1102. The transceiver 1102 is configured to modulate data or other content for transmission by at least one antenna or NIC (Network Interface Controller) 1104. The transceiver 1102 is also configured to demodulate data or other content received by the at least one antenna 1104. Each transceiver 1102 includes any suitable structure for generating signals for wireless or wired transmission or processing signals received wirelessly or by wire. Each antenna 1104 includes any suitable structure for transmitting or receiving wireless or wired signals. One or multiple transceivers 1102 could be used in the ED 1110, and one or multiple antennas 1104 could be used in the ED 1110. Although shown as a single functional unit, a transceiver 1102 could also be implemented using at least one transmitter and at least one separate receiver.

The ED 1110 further includes one or more input/output devices 1106 or interfaces (such as a wired interface to the Internet 1050). The input/output devices 1106 facilitate interaction with a user or other devices (network communications) in the network. Each input/output device 1106 includes any suitable structure for providing information to or receiving information from a user, such as a speaker, microphone, keypad, keyboard, display, or touch screen, including network interface communications.

In addition, the ED 1110 includes at least one memory 1108. The memory 1108 stores instructions and data used, generated, or collected by the ED 1110. For example, the memory 1108 could store software or firmware instructions executed by the processing unit(s) 1100 and data used to reduce or eliminate interference in incoming signals. Each memory 1108 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1170 includes at least one processing unit 1150, at least one transceiver 1152, which includes functionality for a transmitter and a receiver, one or more antennas 1156, at least one memory 1158, and one or more input/output devices or interfaces 1166. A scheduler, which would be understood by one skilled in the art, is coupled to the processing unit 1150. The scheduler could be included within or operated separately from the base station 1170. The processing unit 1150 implements various processing operations of the base station 1170, such as signal coding, data processing, power control, input/output processing, or any other functionality. The processing unit 1150 can also support the methods and teachings described in more detail above. Each processing unit 1150 includes any suitable processing or computing device configured to perform one or more operations. Each processing unit 1150 could, for example, include a microprocessor, microcontroller, digital signal processor, field programmable gate array, or application specific integrated circuit.

Each transceiver 1152 includes any suitable structure for generating signals for wireless or wired transmission to one or more EDs or other devices. Each transceiver 1152 further includes any suitable structure for processing signals received wirelessly or by wire from one or more EDs or other devices. Although shown combined as a transceiver 1152, a transmitter and a receiver could be separate components. Each antenna 1156 includes any suitable structure for transmitting or receiving wireless or wired signals. While a common antenna 1156 is shown here as being coupled to the transceiver 1152, one or more antennas 1156 could be coupled to the transceiver(s) 1152, allowing separate antennas 1156 to be coupled to the transmitter and the receiver if equipped as separate components. Each memory 1158 includes any suitable volatile or non-volatile storage and retrieval device(s). Each input/output device 1166 facilitates interaction with a user or other devices (network communications) in the network. Each input/output device 1166 includes any suitable structure for providing information to or receiving/providing information from a user, including network interface communications.

Figure 12:
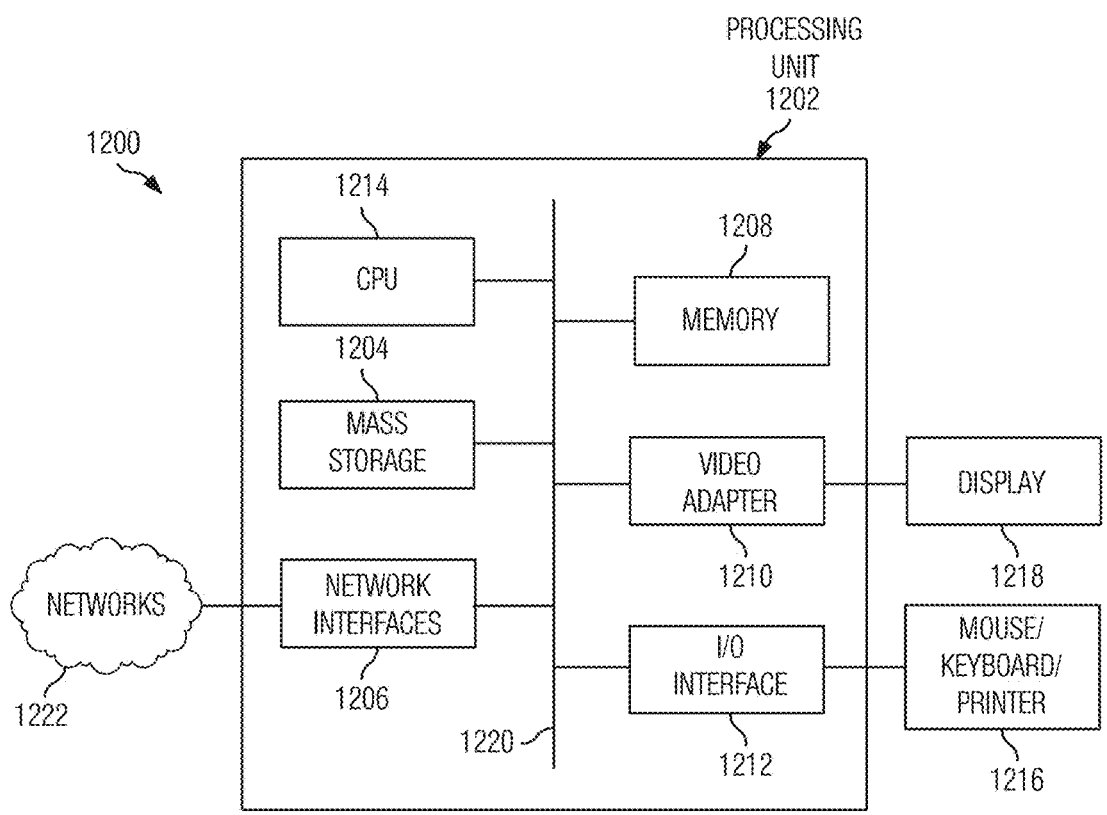
FIG. 12 is a block diagram of a computing system that may be used for implementing the devices and methods disclosed herein.

FIG. 12 is a block diagram of a computing system 1200 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1200 includes a processing unit 1202. The processing unit includes a central processing unit (CPU) 1214, memory 1208, and may further include a mass storage device 1204, a video adapter 1210, and an I/O interface 1212 connected to a bus 1220.

The bus 1220 may be one or more of any type of several bus architectures including a memory bus or memory controller, a peripheral bus, or a video bus. The CPU 1214 may comprise any type of electronic data processor. The memory 1208 may comprise any type of non-transitory system memory such as static random access memory (SRAM), dynamic random access memory (DRAM), synchronous DRAM (SDRAM), read-only memory (ROM), or a combination thereof. In an embodiment, the memory 1208 may include ROM for use at boot-up, and DRAM for program and data storage for use while executing programs.

The mass storage 1204 may comprise any type of non-transitory storage device configured to store data, programs, and other information and to make the data, programs, and other information accessible via the bus 1220. The mass storage 1204 may comprise, for example, one or more of a solid state drive, hard disk drive, a magnetic disk drive, or an optical disk drive.

The video adapter 1210 and the I/O interface 1212 provide interfaces to couple external input and output devices to the processing unit 1202. As illustrated, examples of input and output devices include a display 1218 coupled to the video adapter 1210 and a mouse, keyboard, or printer 1216 coupled to the I/O interface 1212. Other devices may be coupled to the processing unit 1202, and additional or fewer interface cards may be utilized. For example, a serial interface such as Universal Serial Bus (USB) (not shown) may be used to provide an interface for an external device.

The processing unit 1202 also includes one or more network interfaces 1206, which may comprise wired links, such as an Ethernet cable, or wireless links to access nodes or different networks. The network interfaces 1206 allow the processing unit 1202 to communicate with remote units via the networks. For example, the network interfaces 1206 may provide wireless communication via one or more transmitters/transmit antennas and one or more receivers/receive antennas. In an embodiment, the processing unit 1202 is coupled to a local-area network 1222 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an estimating unit or module, an estimating unit or module, a projecting unit or module, a selecting unit or module, a combining unit or module, a precoding unit or module, a processing unit or module, a filtering unit or module, a denoising unit or module, a determining, a decomposing unit or module, or a communicating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by a node, the method comprising:
   estimating first downlink (DL) channel information of first DL channels in accordance with reference signals received on first uplink (UL) channels, the first UL channels being a subset of available UL channels, and the first DL channels corresponding to the first UL channels;
   receiving channel feedback for a set of DL channels;
   estimating second DL channel information in accordance with the first DL channel information and a projection of the channel feedback; and
   communicating in accordance with the second DL channel information.

2. The method of claim 1, the second DL channel information comprising information derived from the first DL channel information and an orthogonal projection of the channel feedback.

3. The method of claim 1, the estimating the second DL channel information comprising:
   projecting, by the node, channel information derived from the channel feedback onto an orthogonal subspace of the first DL channels, thereby producing the projection;
   selecting, by the node, one or more dominant eigenvectors of the projection; and
   combining, by the node, the first DL channel information and the one or more dominant eigenvectors to form the second DL channel information.

4. The method of claim 1, the communicating in accordance with the second DL channel information comprising:
   precoding, by the node, data in accordance with the second DL channel information.

5. The method of claim 1, further comprising:
   processing, by the node, the channel feedback after the receiving the channel feedback, thereby producing processed channel feedback.

6. The method of claim 5, the estimating the second DL channel information comprising:
   projecting, by the node, channel information derived from the processed channel feedback onto an orthogonal subspace of the first DL channels, thereby producing the projection;
   selecting, by the node, one or more dominant eigenvectors of the projection; and
   combining, by the node, the first DL channel information and the one or more dominant eigenvectors to form the second DL channel information.

7. The method of claim 5, the processing the channel feedback comprising:
   filtering or denoising the channel feedback with channel statistics.

8. The method of claim 7, the filtering or the denoising the channel feedback comprising at least one of:
   minimum mean square error (MMSE) filtering the channel feedback, projecting of dominant subspaces of the channel feedback, maximum fairness (MF) or maximum ratio combining (MRC) based filtering of the channel feedback, or quadratic programming of the channel feedback.

9. The method of claim 5, the processing the channel feedback comprising:
   determining, by the node, a conditional covariance for the received channel feedback; and
   filtering or denoising, by the node, the channel feedback in accordance with the conditional covariance.

10. The method of claim 9, the filtering or the denoising the channel feedback comprising at least one of:
    MMSE filtering the channel feedback, projecting of dominant subspaces of the channel feedback, MF or MRC based filtering of the channel feedback, or quadratic programming of the channel feedback.

11. A method implemented by a node, the method comprising:
    estimating first downlink (DL) channel information of first DL channels in accordance with reference signals received on first uplink (UL) channels, the first UL channels being a subset of available UL channels, and the first DL channels being associated with the first UL channels;
    receiving channel feedback for a set of DL channels;
    eigen decomposing the first DL channel information to generate an eigen decomposition of the first DL channel information;
    selecting one or more dominant first eigenvectors of the eigen decomposition as a partial precoder;
    projecting channel information derived from the channel feedback onto an orthogonal subspace of the first DL channels;
    selecting one or more dominant second eigenvectors of the channel information after the projecting of the channel information as second DL channel information of second DL channels, the second DL channels being unassociated with the first UL channels; and
    combining the partial precoder and the one or more dominant second eigenvectors to form a precoder.

12. The method of claim 11, further comprising:
    processing the channel feedback after the receiving the channel feedback.

13. The method of claim 12, the processing the channel feedback comprising:
    filtering or denoising the channel feedback with channel statistics.

14. The method of claim 13, further comprising:
    determining a conditional covariance for the channel feedback, the filtering or the denoising the channel feedback being in accordance with the conditional covariance.

15. The method of claim 13, the filtering or the denoising the channel feedback comprising at least one of:
    minimum mean square error (MMSE) filtering the channel feedback, projecting of dominant subspaces of the channel feedback, maximum fairness (MF) or maximum ratio combining (MRC) based filtering of the channel feedback, or quadratic programming of the channel feedback.

16. A node comprising:
    a non-transitory memory storage comprising instructions; and one or more processors in communication with the non-transitory memory storage, wherein the one or more processors execute the instructions to cause the node to perform operations including:

estimating first downlink (DL) channel information of first DL channels in accordance with reference signals received on first uplink (UL) channels, the first UL channels being a subset of UL channels, and the first DL channels corresponding to the first UL channels;

receiving channel feedback for a set of DL channels;

estimating second DL channel information in accordance with the first DL channel information and a projection of the channel feedback; and communicating in accordance with the second DL channel information.

17. The node of claim 16, the node to the estimating the second DL channel information comprising:

projecting channel information derived from the channel feedback onto an orthogonal subspace of the first DL channels, thereby producing the projection;

selecting one or more dominant eigenvectors of the projection; and combining the first DL channel information and the one or more dominant eigenvectors to form the second DL channel information.

18. The node of claim 16, the communicating in accordance with the second DL channel information comprising:

precoding data in accordance with the second DL channel information.

19. The node of claim 16, the operations further comprising:

processing the channel feedback after the receiving the channel feedback, thereby producing processed channel feedback.

20. The node of claim 19, the estimating the second DL channel information comprising:

projecting channel information derived from the processed channel feedback onto an orthogonal subspace of the first DL channels, thereby producing the projection;

selecting one or more dominant eigenvectors of the projection; and combining the first DL channel information and the one or more dominant eigenvectors to form the second DL channel information.

21. The node of claim 20, the processing the channel feedback comprising:

filtering or denoising the channel feedback with channel statistics.

22. The node of claim 19, the processing the channel feedback comprising:

determining a conditional covariance for the channel feedback; and filtering or denoising the channel feedback in accordance with the conditional covariance.

* * * * *

UNITED STATES PATENT AND TRADEMARK OFFICE
CERTIFICATE OF CORRECTION

PATENT NO. : 12,231,265 B2
APPLICATION NO. : 17/967143
DATED : February 18, 2025
INVENTOR(S) : Yue et al.

Page 1 of 1

It is certified that error appears in the above-identified patent and that said Letters Patent is hereby corrected as shown below:

In the Claims

In Column 24, in Claim 9, Line 12, before "channel" delete "received".

In Column 25, in Claim 17, Line 18, after "claim 16," delete "the node to".

Signed and Sealed this
First Day of April, 2025

Coke Morgan Stewart
*Acting Director of the United States Patent and Trademark Office*